July 15, 1958   B. B. CROWE   2,842,973
GEARING

Filed May 2, 1955   4 Sheets-Sheet 1

INVENTOR
Bailey B. Crowe

WITNESS

July 15, 1958    B. B. CROWE    2,842,973
GEARING
Filed May 2, 1955    4 Sheets-Sheet 2

INVENTOR
Bailey B. Crowe

WITNESS

July 15, 1958
B. B. CROWE
2,842,973
GEARING
Filed May 2, 1955
4 Sheets-Sheet 3
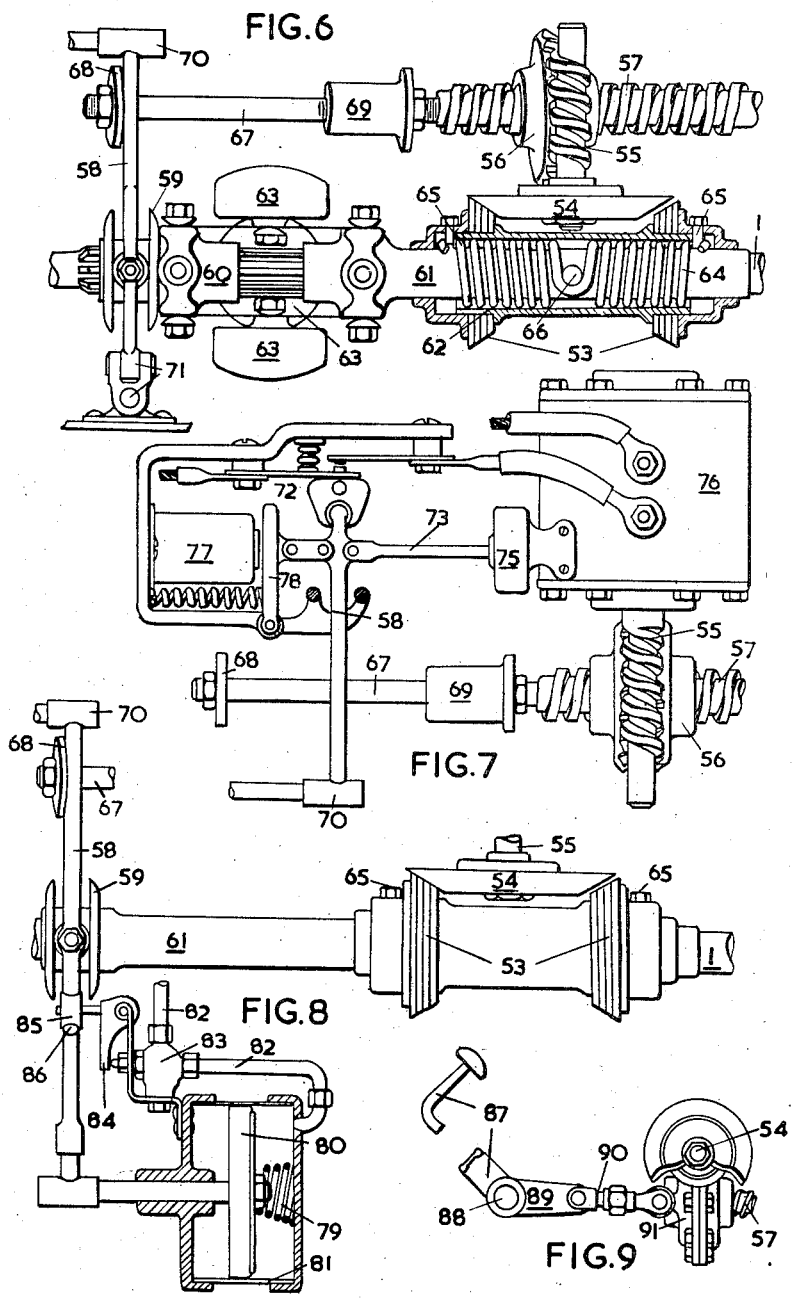

July 15, 1958   B. B. CROWE   2,842,973
GEARING
Filed May 2, 1955   4 Sheets-Sheet 4
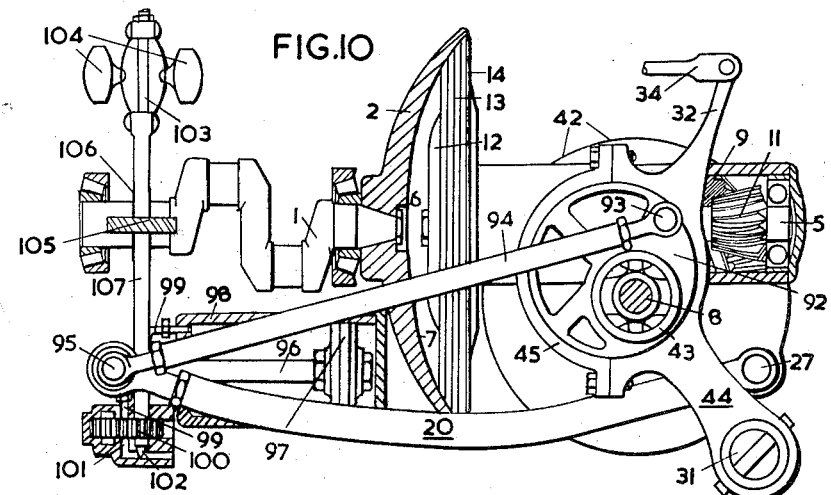
FIG.10
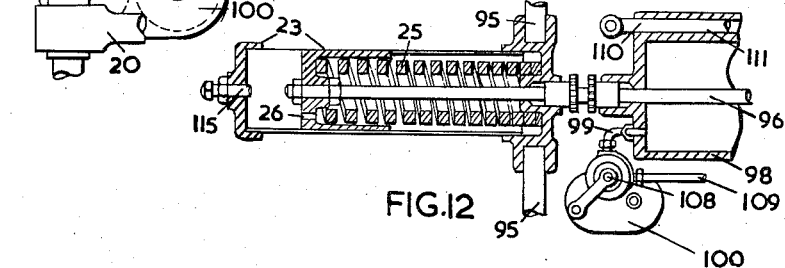
FIG.11
FIG.12
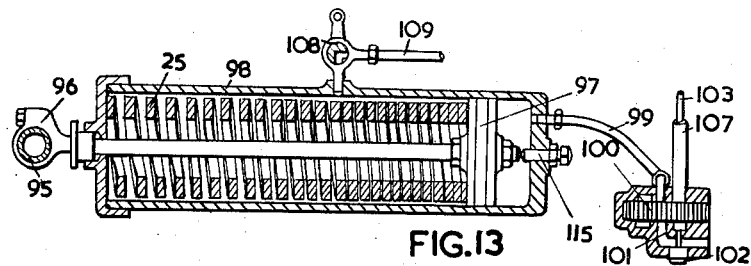
FIG.13

1

United States Patent Office 2,842,973
Patented July 15, 1958

2

2,842,973

GEARING

Bailey Benge Crowe, Corpus Christi, Tex.

Application May 2, 1955, Serial No. 505,141

32 Claims. (Cl. 74—190.5)

This invention is concerned with improvements in or relating to variable speed friction gearing and more particularly, though not exclusively, to variable speed friction gearing for small automobiles.

Features and advantages of the invention will appear sufficiently from the following description given by way of example only of various embodiments of the invention in which reference will be made to the accompanying drawings.

Figures 1, 3, 4, 5 and 10 are elevations partly in section. Figures 2, 6, 8, 11 and 12 are plan views of portions of the device also partly in section. Figure 7 is a plan view of a portion of the device and Figure 9 is an elevation of a portion on a reduced scale. Figure 13 is an incomplete section of a portion in elevation.

Like numerals refer to similar parts throughout the several figures.

Figure 1:
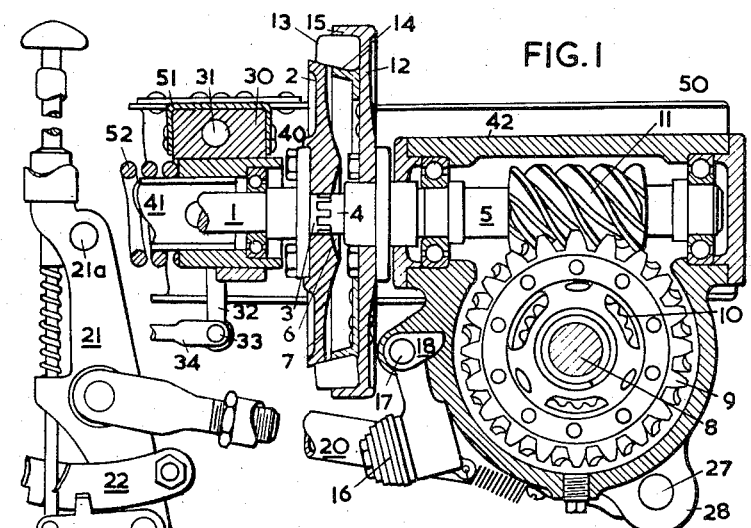
Figure 3:
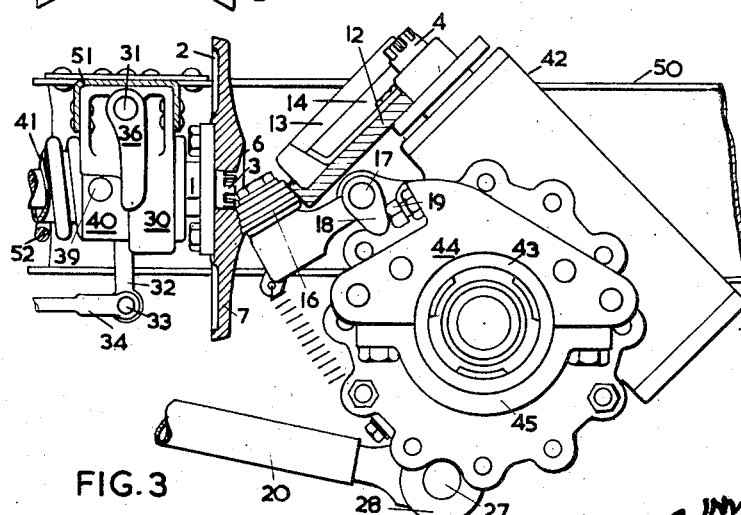
Figure 4:
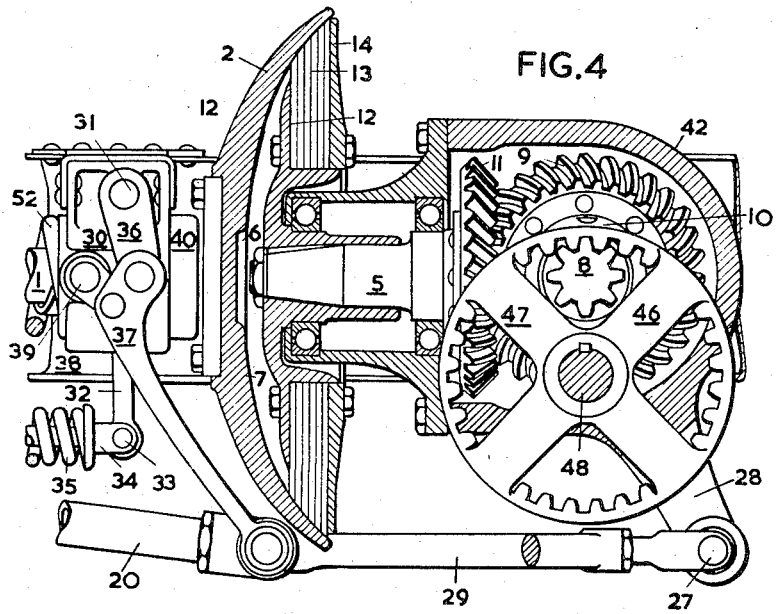
Figure 5:
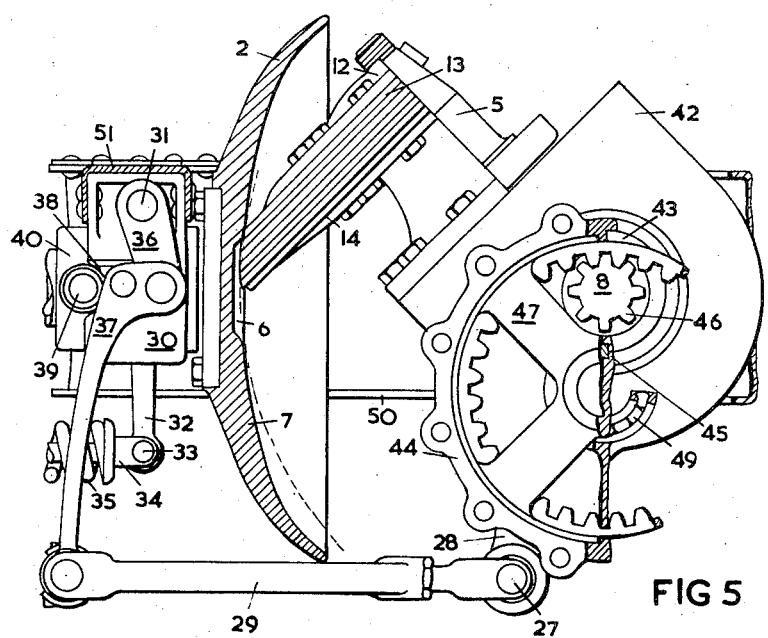

Figures 1 and 3 show the gearing adapted to an automobile with a worm and gear type of final or rear axle drive. Figures 4 and 5 show the ordinary bevel gear type of final drive and Figure 10 the hypoid gear type.

A drive shaft 1 carries a friction disc 2 and may be supported in a slidable sleeve 40 impressed by a spring 52. Figures 1 and 3 show the drive shaft carrying also one element 3 of a positive or dental clutch.

A secondary or driven shaft 5 carries a friction driven ring 13 suitably secured to a driven disc 12, and may carry also the other and engaging element 4 of the positive clutch. The secondary shaft 5 is connected with a tertiary or cross shaft 8 in any of the three types of final drives mentioned.

In the case of a motor vehicle the cross shaft 8 may be divided into two coaxial shafts driven through the conventional differential gear 10. These two shafts should best be connected to the driving wheels of the vehicle through universal drive shafts to enable the gearing device to be mounted on the frame rather than on the driving axle of the vehicle. Another gearing 46—47 shown in Figures 4 and 5 may be interposed between the cross shaft 8 and the driving axle to reduce the reactionary torque on the pivotally supported housing 42. By using external gears instead of those shown a reversal of rotation of the axle shafts 48 is accomplished in addition to the reduction of the torque reaction on the housing 42. Such reversal of rotation would be desirable in the case of a vehicle with front wheel drive.

When the secondary or driven shaft 5 is aligned with the primary or drive shaft 1 the engagement may be through frictional contact alone, frictional contact in conjunction with the positive clutch 3—4, or through the positive clutch alone—if a clearance is provided between the disc 2 and the ring 13.

From the aligned position a change of speed may be obtained by first retracting one of the shafts and its disc from the other shaft and disc by a suitable hand lever or foot pedal connected to the rod or link 34 actuating the arm 32 pivoted at 31. In Figures 1, 3, 4 and 5 the shaft 1 and disc 2 are retracted whereas in Figure 10 the shaft 5 and disc 12 are retracted. With the drive and driven shaft, and their respective cooperating discs disengaged, the shaft 5 is tilted to bring the ring 13 into engagement with various circumferences on the face of disc 2. The tilting of the shaft 5 may be controlled by connecting its supporting housing 42 through a link 20 to a hand lever 21 pivoted at 21a and latched by a suitable notched quadrant 22. In Figures 4 and 5 it will be noted the link 20 is not connected directly to the housing 42, a secondary forked link 29 being interposed between the link 20 and a depending arm 28 of the housing 42.

An ordinary reversing gear may be provided between the shafts 5 and 8 in place of, or in conjunction with, the differential gear 10, as may also a speed changing gear of the sliding or epicyclic type. In Figure 1, a means of reversing the rotation of the shaft 5 is shown whereby an idling roller 16 is introduced between the rim 15 of the disc 12 and a conical recess 6 in the face of the disc 2. The introduction of the idler 16 may be accomplished by a mere continuation of the tilting of the housing 42 to engage an arm 18 with a stop 19 to swing the support of the idler 16 about the pivot 17. Also as shown in Figure 5 the reverse speed may be obtained by passing the edge of the ring 13 beyond the centre of the disc 2.

In the embodiment shown in Figures 1 and 3 the face 7 of the disc 2 is a surface of revolution generated by an arc of a circle lying in the vertical plane of the axis of the shaft 5 and with its centre in the axis of tilting of the housing 42. The curvature of the face 7 may be varied from a true arc to vary the deformation of the restraining spring 52 for the several positions of the ring 13, and thereby provide various degrees of frictional contact pressure.

The ring 13 may be made to overlap the edge of the disc 2 to allow for the engagement of the positive clutch and also release all or part of the end thrust between the shafts 1 and 5, or as shown in Figures 4 and 10 the ring 13 may nest into the disc 2 for the same purpose.

In the embodiments shown in Figures 4 and 5, and also in Figure 10 the face of the disc 2 cannot be generated by the arc of a circle as previously described since the resulting surface would be a zone of a sphere, and the engaging surface of the ring 13 would be a zone of the same sphere. Therefore the two surfaces would coincide throughout considerable areas and set up unallowable cross action or scouring between the friction surfaces in all other than the coaxial or direct drive. To avoid such effect, the curvature of the face of the disc 2 is flattened towards its central portion, and a relative recessional and processional motion between the supports of the two frictional contact surfaces is provided to compensate therefor. In Figures 4 and 5 this relative motion is accomplished through the toggle links 37—38, to shift the pivot 39 on the supporting sleeve 40 of the shaft 1, whereas in Figure 10 the eccentric 92 shifts the supporting pivot 43 of the housing 42.

The flattening of the face 7 would increase the contact pressure as the ring 13 is swung toward the centre of the disc 2 by producing greater deformation in the spring 52 of Figures 4 and 5, but the substitution of a spring 35 to act upon the toggle linkage 37—38 through the supporting arms 36, pivot 31, and lever 32, would provide a uniform pressure throughout the entire range of engagement positions.

Figure 2:
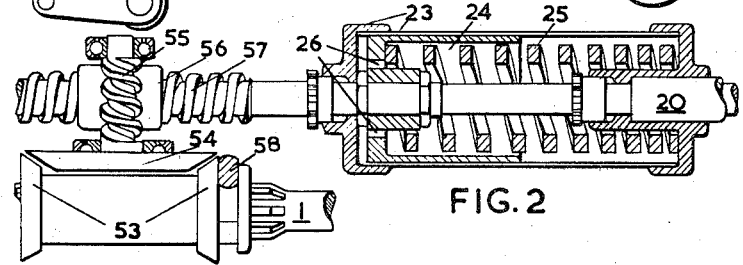

Figure 2 shows a relay gearing for tilting the housing 42. By means of a suitable shifting fork 58 one or other of the friction driving pinions 53 may be engaged with the wheel 54 to drive it in alternate directions. The wheel 54 is connected with a gear 56 by the worm 55. The hub of the gear 56 is threaded to receive the screw 57 which is connected directly, or through a resilient member, with the rod or link 20. The pinions 53 being slidably mounted on the splined shaft 1, derive power therefrom to drive the relay gear. Figures 6 and 8 show automatically controlled devices to engage and disengage the pinions 53 of the relay gearing as will appear later.

Figure 2 and also Figure 12 show a telescopic resilient member which may be interposed between the pivot 27 on the housing 42 and the anchorage of the link 20. It is comprised of a cylinder 23 fitted with a piston 24 restraining in compression a spring 25. The spring may be other than a uniform helix to increase its proportionate resistance to deformation. The piston may be fitted loosely or provided with holes 26 and the cylinder charged with a fluid to check rapid movement of the piston. By placing one way valves in some of the holes 26, the movement of the piston may be impeded unequally in the two directions.

To prevent any tendency of the telescopic resilient member to bend or buckle under the large thrust which may be imposed upon it, a stiffening construction is used. It will be observed that the piston 24 is provided with a skirt similar to that of the ordinary petrol engine piston, and that this skirt or tubular section extends approximately half the length of the cylinder 23. Also the head of the piston is provided with a central boss or cylindrical portion through which an extension of the screw 57 passes and to which it is securely fastened. Moreover, the link 20, to which one head of the cylinder is securely fastened, is of tubular section and the piston rod, or extension of the screw 57, is carried far enought to enter the hollow of the tube 20 and slip within the tube 20 as the piston travels within the cylinder.

Since the cylinder 23 may be charged with a fluid passing through, and acting upon, both sides of the piston 24, both heads of the cylinder are provided with packing glands about the piston rod.

If the clockwise reactionary torque imposed upon the housing 42 by an anti-clockwise driving effort upon the cross shaft 8 is allowed to deform the resilient member, the speed ratio between the shafts 1 and 5 will vary in accordance with such deformation. Thus the speed ratio between a driving and driven shaft can be made to vary automatically in response to the load or torque upon the driven shaft.

Such action would meet the needs of some power driven machines, but not those of an automobile except to serve momentarily as a clutching device rather than a speed changing device.

In the case of a motor car, additional or alternate means of establishing the ratio between the driving and driven shafts, responsive to the speed of the driving shaft, would be desirable. To this end several means to control and restrain the tilting of the housing 42 could be utilized. If such speed responding means were connected with the housing 42, through the resilient member of Figure 2, then the resulting amount of tilt of that housing would be a function of both the driving axle torque and the drive shaft, or engine speed. In order to accomplish automatically the initial clutching of the drive and driven shafts it would be desirable to have the edge of the ring 13 come to rest in front of the recessed portion of the disc 2. To enable the operator of the motor car to keep the vehicle stationary, regardless of the engine speed, some manually controlled means to make the speed responsive device inoperative could be used. Likewise a means of obtaining the reverse speed either independently or in conjunction with the automatic action, could be provided. Figures 6 to 13 inclusive show such means.

Figure 6 shows a centrifugal governor of the drive shaft 1, to engage, for both directions of rotation, and disengage the relay gearing of Figure 2. With the shaft 1 at rest or rotating slowly the centrifugal governor engages one of the pinions 53 to cause the screw 57 to drift toward the left. An increase in speed of the shaft 1, causes the centrifugal weights 63 to shift the sleeve 61 and disengage the relay gear. If the speed of shaft 1 is sufficiently increased the governor engages the other of the pinions 53 with the wheel 54 to reverse its rotation and therefore the drift of the screw 57. The position of the screw 57, which is an extension of the link 20, determines the amount of tilting of the housing 42, and therefore the speed ratio of the shafts 1 and 5.

The sleeve 62 carrying the pinions 53 is connected to the sleeve 61 on the shaft 1 by means of the coil spring 64 interposed between the pin 66 on the sleeve 61 and the screws 65 on the sleeve 62. Since the sleeve 62 is free to rotate upon the slide along the sleeve 61, any resistance to rotation on either of the pinions 53 would wind up the end of the coil spring 64 corresponding to that pinion and thereby accomplish a sudden and adequate engagement between the pinion and the wheel 54. Contrawise if the resistance to rotation of the pinion were decreased sufficiently the coil spring would suddenly disengage the pinion and the wheel 54.

A suitable manual control connected to the rod and socket 70 actuating the shifting fork 58, pivoted in two directions at 71, could be used to modify at will the action of the governor, or neutralize it altogether. Since it is necessary to provide a limit to the travel of the screw 57, such is accomplished by placing adjustable stops 68 and 69 on an extension 67 of the screw 57 to disengage the relay gear when the desired limit is reached. It is intended for the left hand end of the stop 69 to bring the housing 42 to a position so that the edge of the ring 13 falls in front of the recess 6 of the drive disc 2. Then by lifting the shifter fork onto the cylindrical portion of the stop 69 the relay gear becomes engaged to cause the screw 57 to drift farther toward the left, and thus set the housing 42 for the reverse drive shown in either Figure 3 or Figure 5.

Figure 9 shows an alternate construction in which a foot pedal 87 pivoted at 88 and operating through the toggle links 89—90 shifts the housing 91, which supports the wheel 54, to engage it with one of the pinions 53.

Figure 8 shows a control cylinder 81 fitted with a spring return piston 80, to which is connected the fork 58, to accomplish an automatic engagement and disengagement of the relay gear in response to a fluctuating fluid pressure. In the case of an automobile, such fluid pressure may be that induced by the circulation of the water in the cooling system, or the oil in the lubricating system, of the petrol engine. Also the partial vacuum induced in the intake pipe of an engine could likewise be used to allow atmospheric pressure to act in place of either of the above mentioned fluid pressures.

For fluid pressure one side of the piston 80 is connected by the tube 82 to the source of such pressure, and for vacuum control, the other side of the piston is so connected the latter connection being illustrated. Any unbalanced pressure upon the piston 80 first disengages the relay gear from the contact shown in Figure 8, and then engages the other of the friction pinions 53. Such engagement drives the gearing so as to move the screw rod 57 and its extension 67 toward the right until the stop 68 acts upon the fork 58 to disengage the gearing.

To provide an auxiliary manual control of the relay gear, the fork 58 is also connected by the link 70 to a suitable hand lever. Such hand lever may be latched in any desired position, or used at will to modify, or entirely counteract, the effect of pressure effort upon the piston 80. The link 70 may be attached directly to the rod of the piston 80, in which case the piston may be placed, or returned to any desired position by manual means.

An additional or alternate means of controlling the action of the piston 81 is shown in Figure 8 by the valve 83 placed in the tube 82 to intercept the fluid pressure (or vacuum effect).

While any suitable means may be provided for the control of the valve 83, Figure 8 discloses a means for effecting such control through the link 70 and fork 58 which is pivoted in two directions. A bell crank 84 provided to engage the stem of the valve 83 at one end and carry a roller 85, at the other end, engaging a suitable cam 86 on the fork 58, whereby, when it is desired to manually control the gear the effort exerted upon the piston may be intercepted.

Figure 7 shows somewhat diagrammatically, a reversible electrical motor 76 whose rotor is directly connected to the worm 55. The direction of rotation of the motor 76 is controlled by a reversing switch, coupled to a swinging armature 78 which is spring loaded away from an electro-magnet 77. Intermediate of, and acting with, both the switch 75 and armature 78 is the lever 58 which actuates a pivoted rocking cam to close a spring loaded contact switch 72, which is insulated from the supporting frame, upon the switch 75 being placed at either end of its travel. In this way, if the armature 78 moves toward the magnet 77 sufficiently, the motor 76 is driven in one direction; and if sufficiently removed from the magnet 77, the motor is driven in the opposite direction. As in Figures 6 and 8 auxiliary manual means of control is shown in Figure 7 by connecting the lever 58 which is provided with a bracket about which it may pivot, to the link 70. The bracket allows the lever to be operated by the armature. Also the stops 68 and 69 to limit the travel of the screw 57 are shown.

The principal purpose of the relay power gearing shown in Figures 6, 7 and 8 is to make the speed change of the basic device shown in Figures 1, 2, 3, 4 and 5 responsive to the speed of the engine or drive shaft of a motor vehicle, or the speed of the vehicle itself, but it is desired not to restrict the invention to motor vehicles and to make it adaptable to other machines. I believe this objective can be accomplished in any machine which derives its power from a drive shaft.

In the case of Figure 7 the solenoid could be energised by the current output of the conventional electric generator of a motor vehicle or an additional one installed for the particular purpose, but it also could be energised by the current used to drive an electric motor. In this case the relay gearing might be arranged so as to shift the main speed gear into higher ratios with an increase in current rather than a decrease. In other words, it could be used to enable an electric motor to pick up a heavy load momentarily and then shift toward and to the direct drive as the current drops. In any case the solenoid would be actuated by a fluctuating current.

Obviously the electro-magnetic control device of Figure 7, could be applied to actuate the relay gearing of Figure 8, and the fluid pressure or vacuum control of Figure 8 applied to control the motor 76 and switch 72 of Figure 7.

Figure 10 discloses an arrangement whereby the position of the housing 42 is determined by the reactionary torque imposed thereon, opposed by the fluid pressure upon a piston 97 fitted in a cylinder 98. The fluid pressure may be that of the engine lubricating oil impelled by a pump 100 through the tube 99. The clearances between the working parts of the pump 100 may be so arranged as to provide for an increase in fluid pressure within the cylinder 98 in accordance with the speed of the pump, and therefore the speed of the shaft 1, which in this case is shown as the crank shaft of a small automobile engine, from which the oil pump is driven by the gears 105 and 106. If desirable the oil pressure can be further modified or controlled by the centrifugal governor 104 acting upon a plunger 103, within the pump drive shaft 107, to open and close a bypass port 101 by means of a valve 102.

The fluid pressure upon the piston 97 is transmitted to the pivot 27 on the housing 42 through the piston rod 96, the cross rod or yoke 95, and the link 20. An approximate means of balancing the effort of the piston 97 against the torque reaction imposed on the housing 42 for its various positions is obtained by placing of the pivot 27 with reference to the supporting pivot 43 of the housing 42, since an increasing lever arm results as the housing is tilted. In an automobile the torque reaction upon the housing 42 increases considerably as the shaft 5 is tilted farther from the coaxial alignment with shaft 1.

Figure 11 is an enlarged plan view of the cylinder 98 and its appurtenances and in addition shows a spring 75 which may be used to return the housing 42 to the inclined position so that the ring 13 falls in front of the recess 6. The position of the piston 97 and consequently the speed ratio between the shafts 1 and 5 may be determined at the will of the operator by the manipulation of a three way valve 108 directing the flow of fluid to one side or other of the piston 97 or intercepting it altogether. Since it is intended for the cylinder 98, oil pump 100, and valve 108 to be installed within or adjacent to the oil reservoir of the engine of Figure 10 the port 117 of the valve 108 and the port 116 of the cylinder 98 discharge directly into that reservoir. Otherwise tubes not shown would be required. It will be evident that when the fluid pressure is conducted to the tube 99 the housing will swing to give the forward speeds, and diverting the fluid to the tube 109 will give the reverse speeds. In either case the tube not under pressure would discharge back into oil reservoir, but act as a check to rapid motion of the piston somewhat as the holes 26 of the piston 24 in Figure 2.

If it is desired to set and maintain the piston 97 in any of a series of positions, any sort of selective opening and closing of a series of ports 112 in the side of the cylinder 98 can be provided. The hollow plunger 110 with a series of similar but differentially spaced ports 111 could be used. The several positions of the plunger 110 between that shown by the solid and broken lines would successively place each of the ports 112 in communication with the relief port 116, and cause the piston 97 to stop with its pressure side edge just clearing the relieved port.

Figure 12 shows the piston rod 96 acting upon the cross rod or yoke 95 through a telescopic resilient member similar to that of Figure 2, instead of directly as in Figure 11. Since the yoke 95 merely connects the piston rod 96 to the link 20 the function of the resilient member of Figure 12 would be identical with that of Figure 2. An adjustable screw 115 is shown, the purpose of which is to determine one of the limits of travel of the yoke 95.

Figure 13 shows an alternate arrangement whereby the torque reaction spring 25 is placed within the cylinder 98 and against one side of the piston 97. In this case the fluid pressure upon the piston 97 acts with the torque reaction imposed upon the housing 42 instead of against it. Here it would become necessary to reverse the action of the bypass valve 102 as shown in order to increase the fluid pressure with a diminution of speed of the engine shaft 1. If desired an auxiliary manual control of the valve 102 could be provided to modify the action of the centrifugal governor 104 for the forward speeds. Such an auxiliary control would be necessary for the reverse speed, under which condition the valve 108 of Figure 13 is closed to cause the fluid pressure from the pump 100 to move the piston 97 beyond the relief port connecting with the tube 109.

What is claimed is:

1. A variable speed friction transmission gear comprising a first shaft, a friction disc coupled thereto, a second shaft, a friction ring coupled thereto, a carrier supporting the second shaft, a cross shaft geared to the second shaft, the supporting carrier being rotatable about the axis of the cross shaft so that the second shaft may be axially aligned with the first shaft or inclined thereto to engage the friction ring with various circumferences in the face of the friction disc to vary the speed ratio between the first shaft and the second shaft and means to permit the carrier to rotate about the axis of the cross shaft in response to the torque reaction imposed on the carrier by a driving effort upon the cross shaft.

2. A variable speed friction transmission gear in accordance with claim 1 in which the supporting carrier of the second shaft is rotatably linked to an adjustable lever or rod through a resilient member which is deformable under the reactionary torque imposed upon the supporting carrier.

3. A variable speed friction transmission gear according to claim 1 in which the supporting carrier of the second shaft is rotatably linked to an adjustable lever or rod through a telescopic resilient member to restrain rotation of the carrier in response to the reactionary torque imposed thereon.

4. A variable speed friction transmission gear according to claim 1 in which the supporting carrier of the second shaft is rotatably linked to a restraining lever or rod through a resilient member provided with means to impede or dampen rotation of the carrier.

5. A variable speed friction transmission gear according to claim 1 in which the supporting carrier of the second shaft is rotatably linked to an adjustable rod provided with power operated means of adjustment or positioning.

6. A variable speed friction transmission gear according to claim 1 in which the supporting carrier of the second shaft is rotatably linked to an adjustable rod positioned by power operated means and provided with stops to interrupt the power operated means as certain positions of the rod.

7. A variable speed friction transmission gear in accordance with claim 1 in which the supporting carrier of the second shaft is rotatably linked to an adjustable rod positioned by a power operated reversible relay gear.

8. A variable speed friction transmission gear according to claim 1 in which the supporting carrier of the second shaft is rotatably linked to an adjustable rod positioned by a power operated reversible relay gear provided with manual means to actuate the relay gear in either direction for positioning the adjustable rod and to disengage the relay gear.

9. A variable speed friction transmission gear according to claim 1 in which the supporting carrier of the second shaft is rotatably linked to an adjustable rod positioned by a power operated reversible relay gear provided with means responsive to the change of speed of the first shaft to actuate the relay gear.

10. A variable speed friction transmission gear according to claim 1 in which the supporting carrier of the second shaft is rotatably linked to an adjustable rod positioned by a power operated reversible relay gear provided with a centrifugal governor connected to the first shaft to actuate the relay gear.

11. A variable speed friction transmission gear according to claim 1 in which the supporting carrier of the second shaft is rotatably linked to an adjustable rod positioned by a power operated reversible relay gear provided with a fluid or vacuum means to actuate the relay gear in response to fluctuations in the fluid pressure of vacuum intensity.

12. A variable speed friction transmission gear according to claim 1 in which the supporting carrier of the second shaft is rotatably linked to an adjustable rod positioned by a power operated relay gear driven by a reversible electric motor.

13. A variable speed friction transmission gear according to claim 1 in which the supporting carrier of the second shaft is rotatably linked to an adjustable rod positioned by a power operated relay gear driven by a reversible electric motor in which means responsive to the speed of the first shaft are provided for operation of the electric motor.

14. A variable speed friction transmission gear according to claim 1 in which the supporting carrier of the second shaft is rotatably linked to an adjustable rod positioned by a power operated relay gear driven by a reversible electric motor which is controlled by a switch actuated by a spring loaded armature which in turn is actuated by an electromagnet energized in accordance with the speed of the first shaft.

15. A variable speed friction transmission gear according to claim 1 in which the supporting carrier of the second shaft is rotatably linked to a piston within a cylinder with fluid pressure arranged to oppose the rotation of the carrier in response to the reactionary torque imposed upon it.

16. A variable speed friction transmission gear according to claim 1 in which the supporting carrier of the second shaft is linked to a piston subjected to fluid pressure to oppose rotation of the carrier in response to the torque reaction imposed upon it, said fluid pressure being produced by power operated means sufficient to rotate the carrier against the torque reaction imposed upon it.

17. A variable speed friction transmission gear according to claim 1 in which the supporting carrier of the second shaft is linked to a piston subjected to fluid pressure, said fluid pressure being produced by power operated means responsive to the speed of the first shaft.

18. A variable speed friction transmission gear according to claim 1 in which the supporting carrier of the second shaft is linked to a piston subjected to fluid pressure, said linkage incorporating a resilient member deformable by the reactionary torque imposed upon the supporting carrier.

19. A variable speed friction transmission gear according to claim 1 in which the supporting carrier of the second shaft is linked to a piston subjected to fluid pressure, said piston being spring loaded against the fluid pressure and with the torque reaction imposed upon the carrier.

20. A variable speed friction transmission gear according to claim 1 in which the supporting carrier of the second shaft is linked to a piston subjected to fluid pressure, said piston being spring loaded with the fluid pressure and against the torque reaction imposed upon the carrier.

21. A variable speed friction transmission gear according to claim 1 in which the supporting carrier of the second shaft is linked to a piston subjected to fluid pressure on either of its two sides.

22. A variable speed friction transmission gear according to claim 1 in which the supporting carrier of the second shaft is linked to a piston subjected to fluid pressure and with manual means to control the fluid pressure.

23. A variable speed friction transmission gear according to claim 1, in which the supporting carrier of the second shaft is linked to a piston subjected to fluid pressure with manual means to control the fluid pressure so as to position the piston at predetermined stages in its travel.

24. A variable speed friction transmission gear according to claim 1 in which the friction contact face of the friction disc is a toric surface generated by an arc of a circle whose center is in or near the axis of the cross shaft.

25. A variable speed friction transmission gear according to claim 1 in which the friction contact face of the friction disc is a concave surface generated by a curve of decreasing curvature toward the center of the disc to flatten the curvature of the disc towards its center.

26. A variable speed friction transmission gear according to claim 1 in which the frictional contact face of the friction disc is a concave surface of generation flattened towards its center with means to produce a relative recession and procession between the disc and the pivotal support of the rotatable carrier to compensate for or accommodate the flattening of the friction disc towards its center.

27. A variable speed friction transmission gear according to claim 1 in which manual means is provided to engage and disengage the friction ring and friction disc.

28. A variable speed friction transmission gear according to claim 1 in which the adjacent ends of the first shaft and the second shaft are provided with mutually engaging teeth to form a positive drive between these two shafts when they are aligned axially.

29. A variable speed friction transmission gear according to claim 1 in which the rim of the friction disc is tapered and shaped to enter within the inner rim of the friction ring when the first and second shafts are axially aligned.

30. A variable speed friction transmission gear according to claim 1 in which an idling roller is arranged to be interposed between the friction disc and the rim of the friction ring to provided a reverse drive.

31. A variable speed friction transmission gear according to claim 1 in which the friction ring can be brought into engagement with the friction disc past the center of the friction disc to provide a reverse drive.

32. A variable speed friction transmission gear according to claim 1 in which the friction disc is provided with a central recess to enable the friction ring and disc to be disengaged without displacing the friction disc and the support of the rotatable carrier relative to each other.

References Cited in the file of this patent

UNITED STATES PATENTS

| | | |
|---|---|---|
| 1,469,123 | Jones | June 3, 1924 |
| 1,772,593 | Robertson | Aug. 12, 1930 |
| 1,850,158 | Robertson | Mar. 22, 1932 |
| 2,481,315 | Lehnert | Sept. 6, 1949 |
| 2,617,309 | Casson | Nov. 11, 1952 |

FOREIGN PATENTS

| | | |
|---|---|---|
| 366,396 | France | Oct. 3, 1906 |
| 465,854 | France | Feb. 16, 1914 |